United States Patent [19]

Feinberg

[11] 3,816,281

[45] June 11, 1974

[54] POLY (VINYL PYRROLIDONE) STABILIZED POLYMERIZED EPOXY COMPOSITIONS AND PROCESS FOR IRRADIATING SAME

[75] Inventor: Jacob Howard Feinberg, Hightstown, N.J.

[73] Assignee: American Can Company, Greenwich, Conn.

[22] Filed: Apr. 30, 1973

[21] Appl. No.: 355,884

[52] U.S. Cl. ............... 204/159.11, 96/75, 96/91 R, 96/114, 96/115 P, 117/93.31, 117/132 BE, 117/138.8 N, 117/155 R, 204/159.14, 204/159.15, 204/159.18, 204/159.23, 204/159.24, 260/2 EP, 260/2 BP, 260/45.8 NZ, 260/47 EP, 260/47 R, 260/783 R, 260/88.3 A, 260/88.5 R, 260/829, 260/830 W, 260/836, 260/837 R, 260/895

[51] Int. Cl. ........................ B01j 1/10, C08d 1/00

[58] Field of Search ...... 96/115 P, 115 R, 75, 91 R; 204/159.11, 159.14, 159.22, 159.23, 159.24, 159.15; 260/2 EP, 2 BZ, 47 EP

[56] References Cited
UNITED STATES PATENTS
3,721,617   3/1973   Watt ............................. 204/159.24

Primary Examiner—Murray Tillman
Assistant Examiner—Richard B. Turer
Attorney, Agent, or Firm—Robert P. Auber; Ernestine C. Bartlett; Harries A. Mumma, Jr.

[57] ABSTRACT

Polymerization of epoxides and mixtures of epoxides with lactones and vinyl compounds, polymerizable through the action of cationic catalysts, is controlled by providing, in association with a radiation-sensitive catalyst precursor, a gelation inhibitor in the form of a substituted poly(vinyl pyrrolidone) wherein the carbon atom adjacent to the carbonyl group contains an alkyl or aryl substituent.

31 Claims, No Drawings

POLY (VINYL PYRROLIDONE) STABILIZED POLYMERIZED EPOXY COMPOSITIONS AND PROCESS FOR IRRADIATING SAME

BACKGROUND OF THE INVENTION

When a flowable liquid composition is applied to a substrate to form a coating or decoration, or to provide graphic or other information, it may be advantageous shortly after application to obtain rapid hardening, gelling, or curing of the coated material by irradiation for a brief period of time. This is particularly advantageous if the liquid coating composition is substantially free of volatile solvents which do not themselves participate in the curing, since the hardening then may be effected very rapidly without interference from evolving vapors and without producing waste gases. Practical coating systems of these types have been developed, utilizing photosensitive latent curing catalysts which respond to irradiation by releasing the catalytic agent.

One such coating system utilizes epoxide compounds (or mixtures) of relatively low molecular weight, which may be formulated to provide good flow characteristics with or without the use of inert solvents. Cationic polymerization catalysts cause the epoxy ring to open through cleavage of a carbon-oxygen bond, forming a cationic reactive intermediate. The reaction thus initiated may repeat itself rapidly many times in a chain reaction to form a polymer of repeating ether units. Gelling time for such photosensitive catalytic polymerization may be short enough to provide a substantially hardened coating a short distance after irradiation is carried out while the substrate passes at high speed along a treatment line.

However, epoxide and related compositions containing photosensitive catalytic precursors have a tendency to gel upon standing, even in the absence of light or ultra-violet radiation. This tendency to undergo premature reaction is particularly troublesome in the case of formulations which are substantially free of unreactive diluents or solvents. The polymerization reaction is exothermal and, where large masses are involved, can generate sufficient heat to cause combustion of the epoxide resins. In U.S. Pat. No. 3,721,617 issued Mar. 20, 1973 to William R. Watt and commonly assigned herewith, certain cyclic amides, including polyvinylpyrrolidones, are disclosed and claimed as gelation inhibitors for polymerizable compositions comprising epoxides and mixtures of epoxides with other monomers. Such compositions are photosensitive and when exposed to an energy source such as actinic radiation yield epoxy polymers which are receptive to ink and possess inherent toughness, abrasion resistance, adherence to metal surfaces, etc., but prior to such exposure are stable compositions having extended storage or potlife, premature reaction in the dark or at minimal levels of radiation being inhibited so that the mixtures may be retained for periods of days or more before application.

It has now been discovered that a specific class of poly(vinylpyrrolidones) when utilized as gelation inhibitors or stabilizers for polymerizable epoxy-containing compositions are capable of extending the pot life or storability of such compositions for periods of months and more.

SUMMARY OF THE INVENTION

Accordingly, new and improved stabilized polymerizable compositions comprising epoxides and mixtures of epoxides with monomers selected from the group consisting of lactones and vinyl-coating compounds are provided containing radiation-sensitive catalyst precursors and also a specific class of gelation inhibitors which, upon admixture with the polymerizable materials, inhibit gelation of the reaction composition prior to irradiation. This is accomplished by the inclusion of a small quantity of a substituted poly(vinyl pyrrolidone) wherein the carbon atom adjacent to the carbonyl group contains an alkyl or aryl substituent as gelation inhibitors. Such compositions have greatly extended storage or pot life, premature reaction in the dark or at minimal levels of radiation being inhibited so that the mixtures may be retained for period of months or more before application. Thus, in accordance with the process of the invention, a mixture first is formed of the polymerizable materials, a Lewis acid catalyst precursor, and the substituted poly(vinylpyrrolidone) inhibitor. The resulting mixture, at a convenient time subsequently, is subjected to application of energy, such as actinic or electron beam irradiation, to release the Lewis acid catalyst in sufficient amounts to initiate the desired polymerization reaction.

DETAILED DESCRIPTION

Any monomeric or prepolymeric material, or mixture of such materials, of suitable viscosity or suitable miscibility in solvents, which is polymerizable to higher molecular weights through the action of a cationic catalyst, may be utilized in the process and compositions of the present invention. In a preferred embodiment, any polymerizable, monomeric or prepolymeric epoxide material or mixture of such epoxide materials, or suitable viscosity alone or when dissolved in a suitable solvent, may be utilized. The classic epoxy resin is obtained by the well known reaction of epichlorohydrin and bisphenol A (4,4'-isopropylidenediphenol). The reaction product is believed to have the form of a polyglycidyl ether of bisphenol A (the glycidyl groups being more formally referred to as the 2,3-epoxypropyl group). The structure usually assigned to the resinous product is

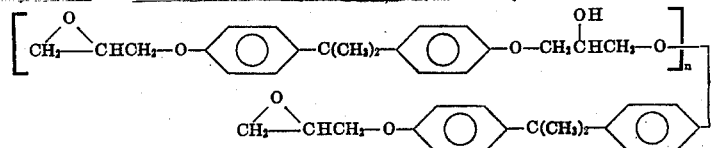

a viscous liquid epoxy resin, average molecular weight about 380, is obtained by reacting the epichlorohydrin in high molecular proportion relative to the bisphenol A, the reaction product containing well over 85 mole per cent of the monomeric digylcidyl ether of bisphenol A ($n = 0$), which may be named 2,2-bis[p-2,3-epoxypropoxy)phenyl]propane, and smaller proportions of polymers in which $n$ is an integer equal to 1, 2, 3, etc. This product exemplifies epoxide monomers and prepolymers, having a moderate molecular weight, preferably of the order of 1,000, or less, which may be cross-linked or otherwise polymerized in accordance with the invention, whereby cleavage of the terminal epoxy or oxirane rings is initiated by the action of the Lewis acid halide released when energy is applied to the latent polymerization catalyst.

Many other epoxide materials are available in polymerizable monomeric or prepolymeric forms. Among these are 1,2-epoxycyclohexane (cyclohexene oxide, also named 7-oxabicyclo-[4.1.0]heptane); and vinylcyclohexene dioxide, more specifically named 3-(epoxyethyl)-7-oxabicyclo[4.1.0]-heptane or 1,2-epoxy-4-(epoxyethyl)cyclohexane. Ethylene oxide (oxirane,

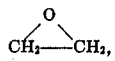

the simplest epoxy ring) and its homologues generally, e.g., propylene oxide (1,2-epoxypropane) and 2,3-epoxybutane, are themselves useful; other useful epoxidic cyclic ethers are the $C_3O$ ring compound trimethylene oxide (oxetane), derivatives thereof such as 3,3-bis(chloromethyl)oxetane (also named 2,2-bis(chloromethyl)-1,3-epoxypropane), and the $C_4O$ ring compound tetrahydrofuran, as examples. Other epoxidized cycloalkenes may be used, a readily available polycyclic diepoxide being dicyclopentadiene dioxide, more specifically identified as 3,4-8,9-diepoxytricyclo[5.2.1.0$^{2,6}$]decane. A suitable polyfunctional cyclic ether is 1,3,5-trioxane.

Glycidyl esters of acrylic acid and of its homologs, methacrylic acid and crotonic acid, are vinyl epoxy monomers of particular interest. Other such monomers are allyl glycidyl ether (1-allyloxy-2,3-epoxypropane) and copolymers thereof with glycidyl methacrylate particularly as disclosed and claimed in co-pending U.S. Application, Ser. No. 297,829 filed Oct. 16, 1972, as well as glycidyl phenyl ether (1,2-epoxy-3-phenoxypropane). Another readily available product is a mixture of ethers of the structure

where R is alkyl, that is glycidyl alkyl ethers. One such mixture contains predominantly gylcidyl octyl ether and decyl glycidyl ether; another contains dodecyl glycidyl ether and glycidyl tetradecyl ether. Epoxidized novolak and epoxy cresol novolak prepolymers likewise may be used, as well as polyolefin (e.g., polyethylene) epoxides. The latter are exemplified by epoxidized, low molecular weight by-products of the polymerization of ethylene, which may be separated as mixtures high in 1-alkenes in the range from about 10 to 20 carbon atoms, that is from about 1-decene to about 1-eicosene. Epoxidation then provides mixtures of the corresponding 1,2-epoxyalkanes, examples being mixtures high in the 1,2-epoxy derivatives of alkanes having 11 to 14 carbons, or having 15 to 18 carbons.

Esters of epoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexanecarboxylic acid is the diepoxide (3,4-epoxycyclohexyl)methyl 3,4-epoxycyclohexanecarboxylate. Another suitable diepoxide may be obtained as an ester of a substituted (epoxycycloalkyl)methanol and a dibasic acid, for example, bis[3,4,-epoxy-6-methylcyclohexyl)methyl] adipate, which may be named alternatively bis[4-methyl-7-oxabicyclo-[4.1.0]hept-3-yl)methyl] adipate. Diepoxide monomeric materials may be obtained conveniently as bis(epoxyalkyl) ethers of glycols, an example being the diglycidyl ether of 1,4-butanediol, that is, 1,4-bis-(2,3-epoxypropoxy)-butane. This diepoxide is related to the digylcidyl ether of bisphenol A, shown above as 2,2-bis[p-(2,3-epoxypropoxy)phenyl]propane.

Lactones tend to be readily polymerizable under the action of a cationic catalyst such as a Lewis acid. Lactone monomers suitable for admixture in the compositions of the invention may be any lactone which is polymerizable to higher molecular weights through the action of cationic catalysts. Such lactones are described and claimed in co-pending U.S. application Ser. No. 292,759, filed Sept. 27, 1972, entitled "Photopolymerization of Lactones" and commonly assigned herewith. Lactones preferred for use in the instant compositions are cyclic esters, derived from hydroxy acids and represented by the general formula:

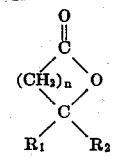

wherein $R_1$ and $R_2$ is hydrogen or alkyl, preferably lower alkyl containing 1 to 6 carbon atoms and $n$, the number of methylene groups is an integer of 1–13. Such cyclic esters are derived from hydroxy acids containing between 3 to 15 carbon atoms including the beta, gamma, delta and epsilon forms of propiolactone, octanoic lactone, pentadecylic lactone, etc. Especially preferred are B-propiolactone and gammabutyrolactone. Many of such compounds are readily available commercially or their preparation is readily had by methods known in the art, for example, by intramolecular conversion of the corresponding hydroxy acid effected by heating.

Various ethylenically unsaturated materials are likewise suitable for admixture in the present invention. The preferred compounds are vinyl compounds, containing a polymerizable

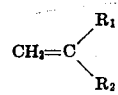

group wherein $R_1$ and $R_2$ may be hydrogen, aryl, alkyl, alkoxy, aryloxy, carbozolyl, etc. Such compounds include styrene, alkyl and halo-substituted styrenes such as $\alpha$-methyl styrene, $\alpha$-chlorostyrene, ethyl styrene; o, m and p-alkyl styrenes such as 2,4-dimethyl styrene, meta-propyl styrene, dichlorostyrene, bromostyrene, etc.; vinyl ethers such as isobutyl vinyl ether, cetyl vinyl ether, vinyl methyl ether, vinyl ethyl ether, dodecyl vinyl ether, vinyl 2-chloroethyl ether, vinyl 2-ethylhexyl ether, vinyl isopropyl ether, vinyl decyl ether, vinyl 2-ethoxyethyl ether, vinyl methoxymethyl ether, vinyl benzyl ether, vinyl 3-phenylpropyl ether, vinyl 1-cyclohexyl ethyl ether, vinyl phenyl ether, etc.; vinyl carbazoles such as N-vinyl carbazole, etc.

Such polymerizable monomer mixtures will usually contain a predominant proportion of epoxide material. In general, such mixtures will contain from about 0.25 to 98, preferably 10 to 50 parts epoxide per part of lactone or vinyl monomer.

The materials utilized as latent polymerization initiators in the process and compositions of the present invention are radiation-sensitive catalyst precursors which decompose to provide a Lewis acid upon application of energy. The energy required for effective decomposition may be energy applied by bombardment with charged particles, notably by high-energy electron beam irradiation. Preferably, however, the catalyst precursors are photosensitive, and the required energy is imparted by actinic irradiation, which is most effective at those regions of the electromagnetic spectrum at which there is high absorption of electromagnetic energy by the particular catalyst precursor used. More than one of these types of energy may be applied to the same system; e.g., ultraviolet light irradiation followed by electron beam irradiation, may be employed, although irradiation ordinarily can effect a suitable cure.

The preferred photosensitive Lewis acid catalyst precursors are aromatic diazonium salts of complex halogenides, which decompose upon application of energy to release a halide Lewis acid. The aromatic diazonium cation may be represented generally as $[Ar\text{-}\overset{+}{N} \equiv N]$, where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by $[MX_{n+m}]^{-m}$. Thus, the photosensitive salt and its decomposition upon actinic irradiation may be depicted as follows: $[Ar\text{-}\overset{+}{N} N]_m[MX_{n+m}]^{-m} \xrightarrow{h\nu} mAr\text{-}X + nN_2 + MX_n$     I.

where X is the halogen ligand of the complex halogenide, M is the metallic or metalloid central atom thereof, $m$ is the net charge on the complex halogenide ion, and $n$ is the number of halogen atoms in the halide Lewis acid compound released. The Lewis acid halide $MX_n$ is an electron pair acceptor, such as $FeCl_3$, $SnCl_4$, $PF_5$, $AsF_5$, $SbF_5$, $BF_3$, and $BiCl_3$, etc. which upon suitable irradiation of the diazonium complex salt is released in substantial quantities and initiates or catalyzes the polymerization process, wherein the monomeric or prepolymeric material is polymerized, crosslinked and interacted as the result of the actinic irradiation.

The diazonium compounds of the present invention may be prepared using procedures known in the art, as disclosed in U.S. Pat. No. 3,708,296 issued Jan. 2, 1973 to S. Schlesinger and commonly assigned herewith and such preparation forms no part of the present invention.

Illustrative of the aromatic diazonium cations comprised in the photosensitive catalyst salts utilized in accordance with the present invention are the following:

p-chlorobenzenediazonium
2,4-dichlorobenzenediazonium
2,5-dichlorobenzenediazonium
2,4,6-trichlorobenzenediazonium
o-nitrobenzenediazonium
p-nitrobenzenediazonium
4-nitro-o-toluenediazonium (2-methyl-4-nitrobenzenediazonium)
6-nitro-2,4-xylenediazonium (2,4-dimethyl-6-nitrobenzenediazonium)
2-chloro-4-(dimethylamino)-5-methoxybenzenediazonium
4-chloro-2,5-dimethoxybenzenediazonium
2,4',5-triethoxy-4-biphenyldiazonium (2,5-diethoxy-4-(p-ethoxyphenyl)benzenediazonium)
2,5-dimethoxy-4'-methyl-4-biphenyldiazonium (2,5-dimethoxy-4-(p-tolyl)benzenediazonium)
2,5-diethoxy-4-(phenylthio)benzenediazonium
2,5-diethoxy-4-(p-tolylthio)benzenediazonium p-morpholinobenzenediazonium
2,5-dichloro-4-morpholinobenzenediazonium
2,5-dimethoxy-4-morpholinobenzenediazonium
4-(dimethylamino)-naphthalenediazonium Illustrative of the complex halogenide anions comprised in the photosensitive catalyst salts utilized in accordance with the present invention are the following:

tetrachloroferrate(III), $FeCl_4^-$
hexachlorostannate (IV), $SnCl_6^{2-}$
tetrafluoroborate, $BF_4^-$
hexafluorophosphate, $PF_6^-$
hexafluoroarsenate(V), $AsF_6^-$
hexafluoroantimonate(V), $SbF_6^-$
pentachlorobismuthate(III), $BiCl_5^{2-}$ A selection of aromatic diazonium salts of complex halogenides is listed in Table I of U.S. Pat. Nos. 3,721,617 and 3,708,292 referred to hereinabove, such disclosures being incorporated herein by the aforegoing reference.

In accordance with the present invention, substituted poly(vinyl pyrrolidones) wherein the carbon atom adjacent to the carbonyl group contains an alkyl or aryl substituent are used in stabilizing amounts as gelation inhibitors.

The substituted poly(vinyl) pyrrolidones found to be effective as the premature-gelatin inhibitor in the process of the present invention are available commercially and their polymeric structure presumably is

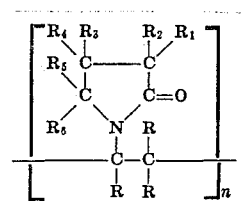

wherein $R_1$ is alkyl or aryl, R, $R_2$, $R_3$, $R_4$, $R_5$ and $R_6$ may be the same or different and may be hydrogen, alkyl, aryl, alkaryl and aralkyl, and $n$ is an integer greater than 1.

Such polymers having average molecular weights, for example, of about 7,300, 10,000, 20,000, 40,000, and 360,000 have been found to be effective. These individual molecular weights correspond to average degrees of polymerization (numbers of monomeric units, $=n$) of about 65, 90, 180, 360, and 3,240 respectively.

Suitable compounds include compounds arising from the formula when $R_1$ is alkyl, $R_3$ and $R_4$ are hydrogen, and $R_5$, $R_6$, and R and $R_2$ are alkyl. Similarly, when $R_1$ is alkyl, $R_2$, $R_3$ and $R_4$ may be alkyl with $R_5$, $R_6$ and R being hydrogen, etc. Exemplary of such compounds are poly(vinyl-3-methyl pyrrolidone), poly(vinyl-3-phenylpyrrolidone), poly(vinyl-3,3-dimethyl-5-phenyl pyrrolidone), etc. Preferably, such compounds are substituted poly(vinylpyrrolidones) available commercially under the trademark GANEX (GAF Corp., New York, New York). Especially preferred and suitable are the polymers of the Ganex V and P series having average molecular weights within the range of about 7,000 to 20,000.

Referring to equation I hereinabove showing the photolytic decomposition of the catalyst precursor, the halide Lewis acid $MX_n$ released reacts with the epoxide or other polymerizable material with a result exemplified by the following:

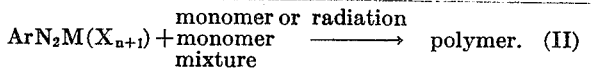

$$ArN_2M(X_{n+1}) + \text{monomer} \xrightarrow[\text{mixture}]{\text{monomer or radiation}} \text{polymer.} \quad (II)$$

The cationic catalyst is believed to act by cleaving a carbon-oxygen epoxy or lactone bond, or by opening the double bond in a vinyl(ethylenic) monomer, initiating growth of a polymeric chain or permitting formation of a cross-linkage. A general application of the process embodied by equations I and II can be as follows: a diazonium complex salt, for example, as identified hereinabove, is admixed, with or without the use of a suitable solvent, with an epoxy monomer or epoxy monomer in admixture with a lactone or vinyl monomer and a quantity of stabilizer. The mixture is thereafter coated on a suitable substrate such as a metal plate, plastic, or paper, and the substrate is exposed to ultraviolet or electron beam radiation. On exposure the diazonium compound decomposes to yield the Lewis acid catalyst, which initiates the polymerization of the epoxy monomer or mixture of monomers. The resulting polymer is resistant to most solvents and chemicals.

The source of radiation for carrying out the method of the present invention can be any suitable source, such as the ultraviolet actinic radiation produced from a mercury, xenon, or carbon arc, or the electron beam produced in a suitably evacuated cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficient absorbtion of energy to excite the desired decomposition.

For an imaging system, the mixture, which may contain a suitable solvent in substantial proportions, is coated on a metal plate, dried if necessary to remove solvent present, and the plate is exposed to ultraviolet light through a mask or negative. The light initiates polymerization which propagates rapidly in the exposed image areas. The resulting polymer in the exposed areas is resistant to many or most solvents and chemicals, while the unexposed areas can be washed with suitable solvents to leave a reversal image of the polymer in this embodiment.

The polymers produced by the polymerizing process of the present invention are useful in a wide variety of applications in the field of graphic arts, due to their superior adhesion to metal surfaces, excellent resistance to most solvents and chemicals, and capability of forming high resolution images. Among such uses are photoresists for chemical milling, gravure images, offset plates, stencil-making, microimages for printed circuitry, thermoset vesicular images, microimages for information storage, decoration of paper, glass, and packages, and light-curable coatings.

The procedures for mixing the stabilized radiation-sensitive compositions of the present invention using the polymerizable materials are relatively simple. The polymerizable mixture is combined with the catalyst precursor and the inhibitor, if desired with a suitable inert volatile solvent. By such a suitable solvent is meant any solvent compound or mixture which boils below about 190°C and which does not react appreciably with the polymerizable material, the catalyst precursor, or the inhibitor. Examples of such solvents include acetone, toluene, methyl ethyl ketone, ethyl ether, anisole, dimethyl ether of diethylene glycol (bis(2-methoxyethyl)ether), monochlorobenzene, 1,1,2,2-tetrachloroethane, o-chlorotoluene, o-dichlorobenzene, and trichloroethylene or mixtures thereof.

The amount of catalyst precursor employed should be sufficient to insure complete polymerization. It has been found that quite satisfactory results are obtained by providing a diazonium complex salt in amount by weight from about 0.5 percent to about 5 percent of the catalyst precursor relative to the weight of the polymerizable material provided, about 1 percent or less being amply effective with some monomer-catalyst precursor systems.

The amount of the substituted poly(vinylpyrrolidone) needed for the desired stabilizing effect is determined readily for given ingredients, using simple tests performed quite readily by the skilled formulator, preferably covering a range of test proportions to determine storage or pot life as a function of inhibitor proportion. A convenient test procedure involves viscometer measurements after storage in the dark for a period as long as the maximum storage life needed for the operation in which the stabilized mixed polymerizable composition is to be used. Most coating and printing operations, for example, can utilize formulations having a viscosity within a substantial pre-determined range, whether a relatively low-viscosity or high-viscosity range, and use of the inhibitor can maintain the formulations within the desired viscosity range for a much longer period. The viscosity of the freshly prepared mixture, even if solvent free, is low enough in some cases to permit substantial polymerization before the composition becomes too viscous to be usable.

The examples set out hereinbelow will indicate the range of proportions within which the inhibitor usually is required. As little as 0.05 percent by weight of the pyrrolidone relative to the weight of the entire polymerizable composition can be markedly effective for many days of storage, while amounts of the inhibitors over 1 percent by weight seldom are needed. In general, the inhibitor preferably is present in an amount by weight equal to between about 0.02 percent and about 1.5 percent of the weight of the composition. Excessive amounts of the inhibitor may diminish either the short term or the long term stability, or both. It should be kept in mind that unnecessarily large amounts of inhibitor can decrease quite markedly the catalytic potential of the catalyst precursor, and may poison the catalyst to the extent that substantial or sufficient curing cannot occur in a reasonable length of time after application of energy to the composition. For this reason, provision of the inhibitors in great excess of suitable stabilizing amounts should be avoided.

As suggested hereinabove, many substituted (poly-vinylpyrrolidone) derivatives may be used, provided only that the substituents on the carbon atom adjacent to the carbonyl group and on the other members of the heterocyclic ring are substantially inert to the polymerizable material and to the catalyst precursor, which provide the desired end properties of the polymerizable composition as utilized in the polymerizing process of the invention. Of course, in confirming the inert character of the substituted inhibitor, the absence of any substantial deleterious effects on the other constituents of the polymerizable composition need be ascertained only in the presence of the small stabilizing amount of the inhibitor to be used, and over a period of time commensurate with the desired storage or pot life of the composition.

The catalyst precursors listed hereinabove are solids, and the inhibitors utilized in accordance with the present invention also may be solids at room temperature. While it may be possible to dissolve such solid ingredients in one or more of the polymerizable ingredients making up the epoxide or other polymerizable material utilized in the composition, it usually is more convenient for mixing purposes to provide the solid ingredients for the mixing operation already dissolved in a solvent. The use of a small amount of a solvent medium such as acetone, anisole or propylene carbonate often is convenient for introducing liquid additives miscible in the medium, as well as solid additives. It has been found that tetramethylene sulfone (sulfolane) makes an excellent solvent for the inhibitors. It also is a good solvent for the diazonium complex salts and is completely miscible with epoxy resins. A 7.5 percent by weight, solution of inhibitor in sulfolane may make up somewhat over 2 percent by weight of the entire polymerizable composition. If desired to avoid substantially the disadvantages of utilizing an inert solvent medium, the total amounts of any solvents which do not participate in the polymerization reactions, including a solvent such as propylene carbonate and particularly any volatile solvents present, should be kept below about 4 percent by weight.

It may be desirable, however, to include in the composition an inert pigment or filler, which may be present in even a major proportion by weight, or small amounts of inert nonvolatile liquids such as mineral oil. Inclusion of such inert ingredients usually makes advisable a proportionate increase in the optimum amount of catalyst precursor used. Nevertheless, the precursor needed rarely exceeds 5 percent of the entire weight of the composition, and an amount of the inhibitor less than about 1.5 percent of the total weight usually is sufficient.

The following examples will serve further to illustrate the present invention.

EXAMPLE I

A blend of epoxy resins was prepared as follows:

| Epoxy Resin | Viscosity (25°C) Centipoises | Epoxy Value | Parts by Weight |
| --- | --- | --- | --- |
| 1. Diglycidyl ether of bis-phenol A | 4000–6000 | 0.57 | 1800 |
| 2. (3,4-epoxycyclohexyl)-methyl 3,4-epoxycyclohexanecarboxylate | 275 | 0.72 | 900 |
| 3. Alkyl glycidyl ether in which alkyl groups are predominantly n-dodecyl and n-tetradecyl | 8.5 | 0.39 | 270 |

Aliquots of 100 grams each were removed. To the first was added 1.0 grams of p-methoxybenzenediazonium hexafluorophosphate and 2.0 grams of 2 1 percent propylene carbonate in sulfolane. To the second was added 1.0 grams of p-methoxybenzenediazonium hexafluorophosphate, 2.0 grams of 2 percent propylene carbonate in sulfolane, and 0.2 grams of the substituted poly(vinylpyrrolidones) listed below and poly(vinylpyrrolidone), unsubstituted and having an average molecular weight of about 10,000. The samples then were stirred until the diazonium complex salt dissolved and thereafter were stored in the dark at room temperature. Periodically the viscosity was measured by means of a Brookfield viscometer and the time after which the viscosity had doubled was recorded. The results are reported below:

| Sample No. | Inhibitor | Doubling of Viscosity, Days |
| --- | --- | --- |
| A | None | 12 days |
| B | Poly(vinylpyrrolidone) | 32 days |
| C | Ganex V-216[1] | Not determined |
| D | Ganex V-816[2] | 60 days |
| E | Ganex P-804[3] | 50 days |
| F | Ganex P-904[4] | 60 days |

[1]Ganex V-216 is a commercially available substituted poly (vinyl) pyrrolidone having an average M.W. of 7,300.
[2]Ganex V-816 is a commercially available substituted poly (vinyl) pyrrolidone having an average M.W. of 20,000.
[3]Ganex P-804 is a commercially available substituted poly (vinyl) pyrrolidone having an average M.W. of 19,000.
[4]Ganex P-904 is a commercially available substituted poly (vinyl) pyrrolidone having an average M.W. of 16,000.

Portions of Samples C, D, E, and F after aging for about 51 days containing the substituted poly(vinyl)-pyrrolidones were spread on clay-coated paperboard using a No. 3 drawbar. On exposure to a 360 watt mercury vapor lamp, the epoxide film hardened to a tough, solid finish at essentially the same rate and level of exposure as a freshly prepared catalyzed formulation.

It will be seen from the above data that, substituted poly (vinylpyrrolidones) are effective in prolonging the shelf-life of the catalyzed formulations.

It was also found that the tendency of a dark color to form in the formulations was greatly diminished. The formulations of samples C, D, E, and F after aging for 64 days were still reddish in color in contrast to the almost black appearance of the formulations of sample B after 40 days.

EXAMPLE II

An epoxide blend containing the resins of Example I but containing 55 parts by weight of epoxide (1), 30 parts epoxide (2) and 15 parts of epoxide (3) was prepared.

A. A 10 gram aliquot of a mixture containing 50 grams of this epoxide blend, 5.0 grams gamma-butyrolactone, 0.55 grams 4-chlorobenzene diazonium hexafluorophosphate and 1.10 grams propylene carbonate was stored at 0°C for 16 hours. The initial viscosity was found to be 133 cps. at 25°C. After standing at room temperature for an additional 2 hours, the viscosity increased to 2,420 cps.

B. Another 10 gram aliquot of the same composition as in (A) above but to which 0.02 grams Ganex P-904 alkylated poly(vinylpyrrolidone) had been added was found to have a viscosity of 147 cps. at 25°C after standing 18 hours at 0°C. After standing at room temperature for an additional 2 hours, the viscosity was found to be the same as the initial viscosity, 147 cps.

EXAMPLE III

A. A 10 gram aliquot of a mixture containing 50 grams of the epoxide blend described in Example II, 1.5 grams dodecyl vinyl ether, 1.56 grams of a 1:2 solution of P-methoxy benzene diazonium hexafluorophosphate in sulfolane was found to have an initial viscosity of 283 cps. at 25°C and to gel to a solid state in less than 19 hours.

B. Another 10 gram aliquot of the same composition but to which 0.04 grams of Ganex P-904 poly(vinylpyrrolidone) had been added had an initial viscosity of 290 cps. at 25°C. After standing for 19 hours, the viscosity remained the same as initially measured, 290 cps.

What is claimed is:

1. A stabilized polymerizable composition, comprising a polymerizable material consisting essentially of:
   a monomeric or prepolymeric epoxide or mixture of said epoxides or mixture thereof with a monomer selected from the group consisting of lactones and vinyl-containing compounds of the formula $$H_2C=C\begin{matrix}R_1\\R_2\end{matrix}$$

wherein $R_1$ and $R_2$ are selected from the group consisting of hydrogen, alkyl, alkoxy, aryl, aryloxy, halogen, haloalkyl and haloaryl, said material being polymerizable to higher molecular weights through the action of a cationic catalyst;
   a radiation-sensitive catalyst precursor which decomposes upon application of energy to provide a Lewis acid effective to initiate polymerization of said polymerizable material, said precursor being an aromatic diazonium salt of a complex halogenide;
   and a stabilizing amount of a gelatin inhibitor for counteracting prematurely formed Lewis acid, said inhibitor being a substituted poly(vinyl pyrrolidone) wherein the carbon atom adjacent to the carbonyl group contains an alkyl or aryl substituent, and said stabilizing amount of the inhibitor being substantially inert to said polymerizable material and said catalyst precursor.

2. The composition of claim 1, in which the polymerizable material is a mixture of epoxides.

3. The composition of claim 1, in which the polymerizable material is a mixture of epoxides and a lactone.

4. The composition of claim 3, in which said lactone is gamma-butyro-lactone.

5. The composition of claim 1, in which the polymerizable material is a mixture of epoxides and a vinyl-containing compound.

6. The composition of claim 1 wherein said inhibitor is a poly(vinyl pyrrolidone) having the general formula:

$$\begin{bmatrix} \begin{matrix} R_4 & R_3 & & R_2 & R_1 \\ R_5-C-----C \\ \diagdown C \diagup \diagdown C=O \\ R_6 \diagup \diagdown N \diagup R \\ \hline -C-C- \\ R & R \end{matrix} \end{bmatrix}_n$$

wherein $R_1$ is an alkyl or aryl radical, $R$, $R_2$, $R_3$, $R_4$, $R_5$, and $R_6$ are selected from the group consisting of hydrogen, alkyl, aryl, alkaryl, and aralkyl radicals and $n$ is an integer greater than 1.

7. The composition of claim 6 wherein $R_1$ is alkyl, $R_2$, $R_5$ and $R$ are alkyl and $R_3$, $R_4$ and $R_6$ are hydrogen.

8. The composition of claim 6 wherein $R_1$ is aryl, $R_2$, $R_5$ and $R$ are alkyl and $R_3$, $R_4$ and $R_6$ are hydrogen.

9. The composition of claim 6 in which $R_1$, $R_3$, $R_5$ and $R$ are alkyl and $R_2$, $R_4$, and $R_6$ are hydrogen.

10. The composition of claim 9 in which said alkyl radical is a methyl group.

11. The composition of claim 7 in which said alkyl radical is a methyl group.

12. The composition of claim 6 in which $R_1$ is aryl, $R_3$, $R_5$ and $R$ are alkyl and $R_2$, $R_4$ and $R_6$ are hydrogen.

13. The composition of claim 12 in which said aryl radical is a phenyl group.

14. The composition of claim 1, in which said catalyst precursor is present in an amount equal to between about 0.5 percent and about 5 percent of the weight of said polymerizable material present in the composition.

15. The composition of claim 1, in which said gelation inhibitor is present in an amount by weight equal to between about 0.02 percent and about 1.5 percent of the weight of the composition.

16. The composition of claim 1, in which the total amount of any unpolymerizable volatile solvents present in said composition is less than about 4 percent by weight of the composition.

17. A stabilized polymerizable composition, comprising:
   a liquid monomeric or prepolymeric epoxide material or mixtures of epoxide materials with a monomer selected from the group consisting of gamma butyrolactone, styrene and dodecyl vinyl ether, said mixture being polymerizable to higher molecular weights through the action of a cationic catalyst;
   an aromatic diazonium salt of a complex halogenide which decomposes upon application of energy to provide a halide Lewis acid effective to initiate polymerization of said epoxide material, said salt being present in an amount equal to between about 0.5 percent and about 5 percent of the weight of said epoxide material present in said composition;

and a gelation inhibitor for counteracting prematurely formed Lewis acid, said inhibitor being selected from the group consisting of 3-substituted poly(vinylpyrrolidones) wherein the substituents are alkyl or aryl, present in an amount by weight equal to between about 0.02 percent and about 1.5 percent of the weight of said composition.

18. The composition of claim 17, in which the total amount of any unpolymerizable volatile solvent present in said composition is less than about 4 percent by weight of the liquid composition.

19. The composition of claim 17, in which the polymerizable material is a mixture of epoxides and gamma-butyrolactone.

20. The composition of claim 17, in which the polymerizable material is a mixture of epoxides and dodecyl vinyl ether.

21. The composition of claim 17, in which the polymerizable material is a mixture of epoxides and dodecyl vinyl ether.

22. The composition of claim 17, in which the polymerizable material is a mixture of epoxides.

23. The process of polymerizing a polymerizable material consisting essentially of a monomeric or prepolymeric epoxide, or mixture of said epoxides or mixture thereof with a monomer selected from the group consisting of lactones and vinyl-containing compounds of the formula

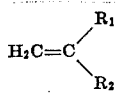

wherein $R_1$ and $R_2$ are selected from the group consisting of hydrogen, alkyl, alkoxy, aryl, aryloxy, halogen, haloalkyl and haloaryl, said material being polymerizable to higher molecular weights through the action of a cationic catalyst, comprising:

forming a mixture of the polymerizable material with a radiation-sensitive catalyst precursor which decomposes upon application of energy to provide a Lewis acid effective to initiate polymerization of said polymerizable material, said precursor being an aromatic diazonium salt of a complex halogenide, and with a stabilizing amount of a gelation inhibitor for counteracting prematurely formed Lewis acid, said inhibitor being a substituted poly poly(vinylpyrrolidone) wherein the carbon atom adjacent to the carbonyl group contains an alkyl or aryl substituent, and said stabilizing amount of inhibitor being substantially inert to said polymerizable material and said catalyst precursor;

and subsequently irradiating the resulting mixture to release said Lewis acid in sufficient amounts to effect substantial polymerization of the polymerizable material.

24. The process of claim 23, in which the polymerizable material is a mixture of epoxides.

25. The process of claim 23, in which the polymerizable material is a mixture of epoxides and a lactone.

26. The process of claim 23, in which the polymerizable material is a mixture of epoxides and a vinyl-containing compound.

27. The process of claim 23, in which said catalyst precursor is mixed with said polymerizable material is an amount equal to between about 0.5 percent and about 5 percent of the weight of the polymerizable material.

28. The process of claim 27, in which said inhibitor is a poly(vinyl-3-alkylpyrrolidone).

29. The process of claim 23, in which said inhibitor mixed with the polymerizable material and the catalyst precursor is a poly(vinyl-3-aryl pyrrolidone).

30. The process of claim 23, in which said gelation inhibitor is mixed with said polymerizable material and said catalyst precursor in an amount equal to between about 0.02 percent and about 1.5 percent of the weight of the resulting mixture.

31. The process of claim 23, in which said mixture resulting from mixing the polymerizable material, the catalyst precursor, and the gelation inhibitor contains less than about 4 percent by weight of any unpolymerizable volatile solvents which may be present therein.

* * * * *

UNITED STATES PATENT OFFICE
CERTIFICATE OF CORRECTION

Patent No. 3,816,281    Dated June 11, 1974

Inventor(s)  Jacob Howard Feinberg

It is certified that error appears in the above-identified patent and that said Letters Patent are hereby corrected as shown below:

At column 2, line 10 "vinyl-coating" should be --vinyl-containing--.

At column 5, line 41, that portion of the equation reading "$nN_2$" should read --$\underline{m}N_2$--.

At column 10, line 20, "21" should be --2--.

At column 11, claim 1, line 58, "gelatin" should be --gelation--.

At column 14, claim 23, line 8, "poly" should be deleted.

Signed and sealed this 19th day of November 1974.

(SEAL)
Attest:

McCOY M. GIBSON JR.           C. MARSHALL DANN
Attesting Officer              Commissioner of Patents